United States Patent [19]
Leenhouts

[11] 3,766,461
[45] Oct. 16, 1973

[54] BACKLASH COMPENSATION CIRCUIT FOR NUMERICALLY CONTROLLED STEPPING MOTOR DRIVEN MACHINE

[75] Inventor: Albert C. Leenhouts, Harwinton, Conn.

[73] Assignee: The Superior Electric Company, Bristol, Conn.

[22] Filed: Oct. 4, 1971

[21] Appl. No.: 186,015

[52] U.S. Cl. .............................................. 318/630
[51] Int. Cl. ........................................... G05b 11/01
[58] Field of Search ............................ 318/630, 696

[56] References Cited
UNITED STATES PATENTS

| | | | |
|---|---|---|---|
| 3,560,830 | 2/1971 | Steinberg | 318/630 |
| 3,355,642 | 11/1967 | Leenhouts | 318/630 |
| 3,172,026 | 3/1965 | Schuman | 318/630 X |
| 3,209,223 | 9/1965 | Scheib, Jr. | 318/630 X |
| 2,913,648 | 11/1959 | Brouwer | 318/630 X |

Primary Examiner—T. E. Lynch
Attorney—Arthur A. Johnson et al.

[57] ABSTRACT

A circuit for use with a numerically controlled machine having lost motion or backlash between a moved part and a stepping motor which enables selection of (1) no backlash compensation, (2) backlash compensation by moving the part to each final position in the same direction or (3) backlash compensation by adding the exact amount of backlash each time the movement of the part is reversed. The circuit has a counter which in selection (2) adds and subtracts a movement greater than the actual backlash while in selection (3), the counter is set to provide the exact amount of backlash and also have its condition used to determine when backlash compensation is required.

4 Claims, 1 Drawing Figure

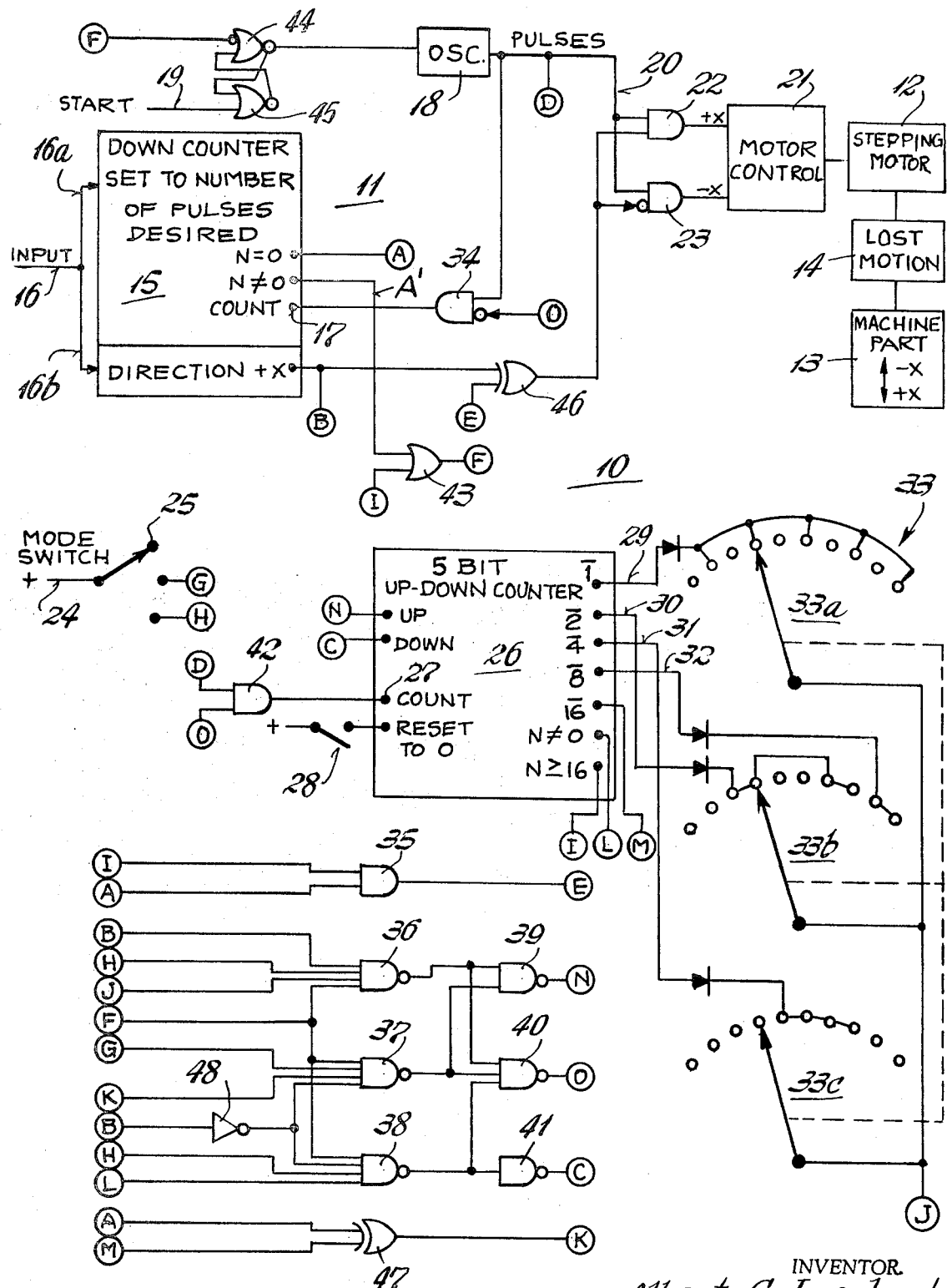

BACKLASH COMPENSATION CIRCUIT FOR NUMERICALLY CONTROLLED STEPPING MOTOR DRIVEN MACHINE

The present invention has particular utility when used with a numerically controlled machine tool which has a part that is to be accurately moved by a stepping motor. In many instances there is lost motion or backlash between the part which may be the bed of a milling machine and the motor. The motor must have a backlash compensating movement in addition to commanded movements in order to assure that the part is moved exactly the commanded distance for each movement.

One manner of accommodating backlash is disclosed in my U.S. Pat. No. 3,355,642, assigned to the assignee of the present invention wherein the part is always moved to its final position in one direction. For command movements in the one direction, no additional motor movements are made for backlash compensation while for command movements in the other direction, a first movement in the other direction is made that is greater than the existing backlash and then a compensating movement of the same extent is made in the one direction as the last movement after the commanded movement. In U.S. Pat. No. 3,560,830, there is disclosed another form of backlash compensation in which the extent of the backlash is first determined and with each command movement that is in the opposite direction from the preceding movement, an additional movement in the commanded direction equal to the extent of the backlash is executed, prior to executing the command movement.

In both of the above-noted patents, as in the present application, the numerical control system utilizes a stepping motor which moves the part a predetermined distance for each pulse received by the motor control. Accordingly, both systems utilize a settable counter for providing the pulses needed for the backlash compensating movements.

It is accordingly an object of the present invention to provide a numerical control system having a backlash circuit which enables a user to select to either exclude backlash compensation, or to effect backlash compensation by moving the part in the same direction to its final position or to compensate for backlash by having the exact amount of backlash included in each movement reversal.

Another object of the present invention is to achieve the above objects with a circuit that is relatively simple in construction, composed of relatively few parts and which may be easily incorporated into presently existing numerically controlled systems.

A further object of the present invention is to provide backlash compensation in a numerical control system by the use of a circuit which includes a counter that is both capable of supplying additional commands for backlash compensation that is greater than the actual backlash compensation or which may supply commands for the exact amount of compensation in addition to determining in the latter instance if backlash compensation is required.

The present invention may be advantageously utilized in a numerical control system such as shown in U.S. Pat. No, 3,466,515 also assigned to the assignee of the present invention, which has a stepping motor connected to a machine part and causes the part to be moved in equal length increments or steps for each change of energization applied to the motor. The system accepts as commands, the number of changes of energization or steps required for a movement either by manual settings or by the use of coded records such as punched tape and translates it into the number of changes of energization to the motor. After the number of changes have been supplied, the motor has produced the required movement but the part to which it is connected may have moved differently by reason of backlash between the motor and the part.

To overcome the backlash error as it is the precise movement of the part that is required, the present invention has a settable switch which in one position does not provide for backlash compensation while in another position it achieves compensation as described in my above-noted U.S. Pat. No. 3,355,642. Additionally, in a third position the exact amount of backlash compensation is included with each change of direction of the part. More specifically the system includes a logic circuit and a five bit up down counter (having a maximum count of, for example, 32 through a different numbered counter may be employed if desired). The count of the counter is used to control the extent of the compensating movement and a'so the counter count is sensed and used to determine if the reverse movement backlash compensation is required.

Other features and advantages will hereinafter appear.

Referring to the drawing, the sole FIGURE is a logic and diagrammatic illustration of the backlash circuit of the present invention.

Referring to the drawing the backlash compensating circuit is generally indicated by the reference numeral 10 and is shown interconnected with portions of a numerical control system 11 of the type which has a stepping motor 12 that is connected to precisely move a machine part 13. As indicated by the block 14 there is lost motion or backlash between the movement of the stepping motor 12 and the machine part 13. The numerical control system includes a binary coded decimal down counter 15 having an input 16 which sets the count of the down counter to the number of pulses desired for the stepping motor to move on a line 16a and also the direction of movement either +X or −X on a line 16b.

The down counter 15 is provided with two outputs indicative of its condition, one output being connected to the terminal A denoted $N = 0$ and it supplies a logic 1 or high voltage level only when the count of the counter 15 is zero. If the count is not zero, then there is a 1 or high voltage on a lead A' otherwise there is a logic 0 or low voltage level. In addition, at a terminal 17 denoted count, positive pulses are received by the counter 15 and for each pulse the counter will decrease its numerical count by one.

The pulses in the system are derived from an oscillator 18 which has its operation initiated by a command on a start lead 19 to supply pulses on a lead 20 to a motor control 21 which translates each pulse received into a change of energization of the stepping motor 12 and accordingly an incremental movement thereof and of the part 13. The motor control 21 has a pair of gates 22 and 23 each having an input connected to the pulse lead 20 and indirectly to the direction command 16b of the counter 15 such that when the input direction is, for example, + , the gate 22 will permit the pulses to pass to the motor control 21 as indicated by the symbol +X to cause the stepping motor 12 to move the part in this direction while if the input direction command is — indicating a movement in a reverse direction, the gate 23 permits the pulses to pass to the motor controller on the lead denoted −X to cause the motor to be energized to move in the other direction. The direction command consists of a 1 or high positive voltage for a +direction and a lack of the voltage, i.e., logical 0 for the − direction and this information controls which gate 22 and 23 each pulse will pass.

It will also be understood that in normal operation each of the pulses delivered to the motor control 21 is also delivered to the count terminal 17. The down counter decreases its count by one for each pulse received until its count becomes zero at which time the oscillator 16 is prevented from supplying further pulses to the motor control. The numerical control circuit has caused the stepping motor 12 to thus take the number of steps to which the down counter was commanded by the input 16a and in the direction indicated by the input command 16b.

The above-described circuit is basically disclosed in my U.S. Pat. No. 3,355,642, it being understood that information to the down counter may be supplied in any desired manner as by settable switches or coded records such as punched tape, etc.

The backlash circuit includes a mode switch 24 having a first terminal 25 which, if selected, prevents any backlash compensation; a terminal G which, if selected, provides backlash compensation by moving the part to each final commanded position in the same direction and a third position wherein there is a connection to a terminal H which adds the exact amount of lost motion 14 to each command movement whenever there is a reversal of movement. There is additionally provided a binary coded decimal five bit up-down counter 26 having a count terminal 27 on which pulses are received with each pulse changing the count of the counter by one. A + or logical 1 voltage at the terminal N causes the counter's count to increase by one for each pulse while a logic 1 voltage at the terminal C causes the counter to decrease its count by one for each pulse. A switch 28 is connected to the counter and when operated sets the counter to a zero count which normally occurs only at the beginning of a series of commands.

The count of the counter 26 is indicated on leads 29, 30, 31 and 32 and terminal M. Each of these five connections has a logical 1 or a high + voltage, if the statement to which the lead or terminal is connected is true and accordingly the counter 26 by being a five bit counter has five binary stages with the lead 29 being connected to the first stage, the lead 30 to the second, the lead 31 to the third, the lead 32 to the fourth and the terminal M to the fifth. For counts of the counter 26 representing in binary form even decimal numbers 0, 2, 4, 6, 8 10, etc., the lead 29 will have a logic 1 thereon while for odd numbers it will be a logic 0; for numerical numbers or counts 0, 1, 4, 5, 8, 9, 12 and 13, etc., the lead 30 will be a logic 1; for numbers 0, 1, 2, 3, 8, 9, 10 and 11,etc., the lead 31 will be a 1 while the lead 32 for numerical counts of 0 through 7 and 16–23 will be a logic 1. In addition, the terminal M will be a 1 for all counts of the counter except for a count of 16 through 31. A terminal L will be a logic 1 if the count of the counter is not zero. The terminal I will have a logic 1 whenever the count of the counter is 16 or more, it being understood that the counter has a maximum count of 31 and will spill over to a zero count with the next added input pulse.

Connected to the leads 29, 30, 31 and 32 is a three deck switch generally indicated by the reference numeral 33 with each deck having ten terminals. The deck 33a has its terminals interconnected as shown to the lead 29, the deck 33b has its terminals connected as shown to the leads 30 and 32 and the deck 33c has its terminals also connected as shown to lead 31. The three selector arms of the switch are connected together to a terminal J as indicated by the solid electrical line while their mechanical connection is shown by the dotted line and requires that the arms be moved together to have the same position on each deck.

In addition to the AND gates 22 and 23 the backlash circuit of the present invention includes eight more AND or NAND gates indicated by the reference numerals 34, 35, 36, 37, 38, 39, 40, 41 and 42; three OR or NOR gates 43, 44 and 45; two exclusive OR gates 46 and 47 and an inverter 48. The gates and various components are interconnected together either by the lines as shown or by having similarly lettered circled terminals connected together. As an example, the terminal A is connected to one input of the AND gate 35 and one input of the exclusive OR gate 47; the terminal B is connected as an input to the AND gate 36 and to the invertor 48 which inverts the logic signal on terminal B and supplies it as an input to each of the AND gates 37 and 38.

The diagrammatic representation of each gate follows conventional practice so that each gate will function as recognized in the art to provide a known logic status for different logic state inputs. For example, the gate 35 provides a high or logic 1 output only when both of its inputs are 1, otherwise it provides a logic 0 output. The gate 39, however, is essentially the opposite in that it has a logic 0 output whenever both of its inputs are logic 1 and provides a logic 1 output whenever any one of its inputs is a logic 0.

In the operation of the backlash compensation circuit, with the switch 24 being positioned in contact with the terminal 25 wherein no backlash compensate is desired, the command consisting of the number of pulses desired and the direction are introduced into the counter 15 to set the counter to the number and a start pulse (a logic 1) is provided on the lead 19. In addition, the up-down counter 26 is set to a zero count by switch 28. In this situation terminals B, F, J, K, M, 17 and lead A' all are a logic 1 with the remainder of the terminals having a logic 0. The oscillator receives the command to produce pulses on the lead 20 with the pulses being directed to the gates 22 and 23. The assumed commanded direction is in the + X direction and thus the signal from the exclusive OR gate 46 to the inputs of the AND gates 22 and 23 is a logic 1 and hence only the gate 22 will pass the pulses on the + X lead to the motor control to effect stepping of the motor 12 in the + X direction. In addition, each pulse from the oscillator is fed through the gate 34 to the count terminal 17 with each pulse reducing the count of the counter 15.

Upon the count of the counter 15 becoming 0 the terminals A, B, J, M become 1 which makes the terminal F a 0 by reason of lead A' and terminal I being 0. This makes the output of the gate 44 a 0 and stops the oscillator 18 from supplying further pulses as the motor has been stepped the commanded number of pulses set forth by the input in the + X direction to so move the part the commanded distance in the commanded direction.

For non-backlash compensation movement in the −X direction again the number of pulses desired is supplied on the input lead 16a to set the counter 15 count thereto while the −X direction is set. Accordingly, the terminals F, J, K, M and lead A' are 1 with the remainder being 0 so that when a start pulse is supplied on the lead 19 to the gate 45, the oscillator will begin producing pulses. The exclusive OR gate 46 has a 0 output (both inputs 0) which blocks pulses through the gate 22 but permits pulses to pass through the gate 23 to the minus direction lead of the motor control. The motor will thus step in the negative direction the number of steps desired until the count of the counter, after receiving at the terminal 17 the same number of pulses as the motor, becomes a zero count. The terminal F then becomes 0 stopping further pulses.

For the condition where it is desired to supply backlash compensation by always moving the part 13 to its final commanded position in the same direction, it is assumed that this direction is the + X direction in the specific embodiment herein disclosed and that the compensating movement in the −X direction consists of 16 steps though, of course, a different number of steps may be used if desired but in any event the number of steps utilized produces a movement which is not less than the actual backlash. The mode switch 24 is positioned to engage terminal G. Accordingly, for a command wherein movement is in the + X direction for a desired number of steps, the counter 15 is set for this number and the direction is set to +X which makes terminals B, F, G, J, K, M and lead A' a logic 1 so that when a pulse appears (a change from logic 0 to 1 to 0) on the lead 19, the oscillator will supply to the motor control through the gate 22 to effect movement of the machine part 13 in the +X direction. The count of the counter 15 is decreased by one with each pulse through the terminal 17 until the count of the counter reaches zero at which time terminals A, B, G, J, M are 1 which causes stopping of the oscillator 18 by the terminal F, becoming 0.

For the operation wherein it is desired to move in the −X direction with backlash compensation being effected by the part 13 always attaining its final position after a movement in the +X direction, the mode switch 24 is set to engage terminal G. The counter 26 is set at zero as in the three above-described movements if it is not already at a zero count. Upon the initiation of the start command on the lead 19, after the commands are in the counter 15, terminals F, G, J, K, M and lead A' are each 1. The oscillator will deliver pulses on lead 20 and these pulses will be delivered to the counter 26 through the gate 42 by terminals D and 0 being 1 for each pulse. The terminal N is also a 1 and thus the counter 26 will count up one count for each pulse. Meanwhile each pulse supplied to the counter 26 is directed to the minus axis of the motor control by the exclusive OR gate 46 having both 0 inputs which produces a 0 output and enables gate 23 to pass pulses from lead 20 while prohibiting pulses from passing through the gate 22. Further, during this initial backlash movement wherein there is a determined movement in the −X direction, the pulses supplied to the motor control are prevented from being applied to the counter 15 by the input of the gate 34 connected to the terminal 0 being a 1 which prevents each pulse which is also a 1 from being a 1 at the count terminal 17. The motor will be caused to step in a −X direction for in this specific embodiment 16 steps with each step being counted by the counter 26 but not counted by the counter 15.

When the counter 26 achieves a sixteen count which makes the terminal I a 1, the terminals F, G, I, J, L will each be a logic 1 preventing further pulses to the counter 26 through gate 42 and causes the motor to step the number of pulses in the negative direction dictated by the number in the counter 15 with the count of the counter decreasing by one for each pulse as the gate 34 passes pulses therethrough. Upon the counter 15 reaching a count of zero, the terminals A, E, F, G, I, J, K, L, N, O will be 1, the oscillator 18 will continue to produce further pulses but they will be prevented from being applied to the count terminal 17 by the gate 34 as its input terminal 0 is a logic 1. In addition, the terminal E is a 1 which makes the output of the exclusive OR gate 46 a 1 and enables the gate 22 while disabling the gate 23. Further, the gate 42 conducts pulses to the counter 26 and as the terminal N is a 1 the counter will count up. However, as it is a five bit counter it will count up from 16 to 31 where it spills over and its count becomes zero. During its count from 17 to 32 (or zero) the terminal L is 1 but when the count becomes zero the terminals I and L then both become 0. At this time, terminals A, G, J, M are each 1 with the terminal F being a 0 and this causes the oscillator to stop producing pulses.

Accordingly, in this manner of backlash compensation whenever there is movement in the direction (−X) that is other than the direction (+X) in which the part is to be moved to its final position, there is initially added a set number of pulses (16) in the commanded direction, then the number of pulses desired are supplied in the commanded direction and then the same set number of pulses are supplied to the motor control to cause the motor to move to its final position in the other than commanded direction. It will also be noted that the counter 26 after this operation has again a zero count.

For the other mode of backlash compensation, the selection switch 24 is placed to make the terminal H a logic 1 and the switch 33 is set to the measured amount of backlash that appears in the lost motion 14. In the example hereinafter given, the amount of backlash has been assumed as being equal to three increments of movements or steps and the contact arms of the switch 33 are shown in solid lines at this three step position. With the switch 33 shown, any number of steps from zero to nine may be selected by the position of the switch clockwise about the contacts shown.

In this mode of backlash compensation operation, the compensating movement is provided whenever the desired movement of the machine part is reversed and is effected prior to performing the commanded movement. Thus, for a movement in the +X direction followed by another movement in the +X direction there is no backlash compensation in the second movement but if the third movement is in the minus direction, backlash compensation of three steps is inserted. Moreover, if the next movement is also in the negative direction, no compensation is provided and it is not provided until the commanded movement in the plus direction when it is effected prior to performing such movement.

Accordingly, for a +X movement the selection switch 24 is set at the terminal H, the exact amount of backlash switch 33 is set at three steps, the counter 26 is set to a zero count and the input 16 provides the number of increments desired together with a command for +X direction movement.

The terminals B, F, H, J, K, M, O and lead A' are each 1 so that the oscillator begins providing pulses upon the start signal appearing on the lead 19 and the pulses are directed through the gate 22 to the +X axis of the motor control. They are prevented by the gate 34 from being counted by the counter 15. However, the gate 42 passes each pulse to the counter 26 which by reason of the up terminal N being 1 effects the counter to count up. The counter will count pulses until the count of three is reached when the terminal J becomes 0 by reason of the leads 29 and 30 both being 0 and lead 33c not being connected to its switch arm. With terminal J a 0, terminals B, F, H, K, L, M and lead A' will then be 1, and the oscillator will continue to supply pulses through the gate 22 and also now through the gate 34 to the count terminal 17 none will be supplied to the counter 26 as terminal O is zero. Pulses will be supplied until terminal A becomes 1 and terminal $\overline{A}$ becomes 0 at which time the oscillator will be prevented from producing further pulses and the logic states for the terminals at this stop position have terminals A, G, H, L and M all being 1 with the remainder including lead $\overline{A}$ being 0.

If the next command movement is again in the +X direction the counter 15 and direction control are set by the input information which causes terminals B, F. H, J, L, M and lead A' to be 1 and as the terminal O is 0, pulses are not passed by the gate 42 into the counter. Thus terminal J remains a 0 while gate 34 permits pulses to pass to the counter 15. Accordingly, the pulses from the oscillator will pass directly to the counter 15 and the +X direction of the motor control until the count of counter 15 becomes zero when it will stop the oscillator by the terminals A, B, H, L and M being 1.

It will thus be appreciated that as the counter 26 had the count equal to the setting of the switch 33 that backlash was prevented from being introduced prior to performing the commanded operation.

If, as the next movement with the counter 26 having a count of three, a negative (−X) movement is desired, the input 16 sets the counter 15 and through the lead 16b, the direction to −X. Accordingly, terminals C, F, H, K, L, M and O are 1 together with lead A'. The oscillator 18 begins providing pulses on the lead 20 and the gate 42 permits the pulses to pass to the count terminal of the counter 26 while the gate 34 blocks the pulses to the counter 15. The terminal C by being a 1 causes the counter 26 to count down for each pulse. Also the gate 23 enables pulses to pass while the gate 22 inhibits passage of pulses. This will continue until the terminal L changes to a 0 indicating a zero count of the counter 26 at which time the terminals F, H, J, K, M and lead A' will become a 1 to cause the oscillator to continue to have its pulses directed through the gate 23 to the −X lead and also through the gate 34 to the count terminal 17 but not through the gate 42 to the counter 26.

Upon the count of the counter 15 becoming zero, the terminal A and lead $\overline{A}$ change to 1 and 0 respectively so that the logic states of only terminals A, H, J and M are 1 which causes the oscillator to cease producing pulses.

If the next command is in the negative direction no backlash will be introduced by reason of the count of the counter 26 being 0 so that terminals J and L are 0 and 1 respectively. However, if the movement is to be in the +X direction then the above-described first mode of operation will be effected where backlash is introduced prior to accomplishing the above-noted operation.

It will thus be appreciated that in the third selection of operation whenever there is a reversal of commanded movement that the system will provide the exact amount of backlash compensation depending upon the condition of the counter whether its count is zero or whether it has a count equal to the exact amount of backlash. Thus there is obviated the necessity for providing circuitry which remembers the immediately preceding movement and compares the commanded movement with the preceding movement to determine if backlash is required. Accordingly, the utilization of the counter 26 for not only providing for the amount of backlash in two different modes of backlash compensation but also for providing control over the introduction of backlash simplifies the present system in addition to enabling its use with presently existing numerical controlled systems. Moreover, the system as described is susceptible to economic manufacture use in integrated circuits.

Variations and modifications may be made within the scope of the claims and portions of the improvements may be used without others.

I claim:

1. A compensating system for use with a motor for incrementally moving a machine part in either of two directions wherein there is backlash between the motor and the part, with the backlash being predeterminable as a number of incremental movements of the motor, for overcoming the backlash comprising means for commanding the motor to move the part a number of equal length increments in a selected direction and means for selecting one of three modes of backlash compensation consisting of
   a. no backlash compensation,
   b. backlash compensation for moving the part to each of its final commanded positions in the same direction, and
   c. backlash compensation by adding the predetermined motion to the commanded motion in the same direction as the commanded motion only when the commanded motion is reversed from the immediately preceding commanded motion, in which the system includes a counting means having means for providing a first signal when the counting means has a zero count, a second signal when the counting means has a predetermined count equal to the number of movements in the backlash and a third signal when the counting means has a greater count than the predetermined count and means for using the first and third signals for determining if backlash compensation is to be effected when mode b is selected and setting the extent of the backlash compensation and for using the first and second signals for determining if backlash compensation is to be effected when mode c is selected and setting the extent of the backlash compensation.

2. The invention as defined in claim 1 in which the counting means is an up-down counter and in which there are means for causing said counting means to count up for each backlash compensating directed movement of the motor in one direction and to effectively count towards a zero count for each backlash compensating directed movement of the motor in the other direction.

3. The invention as defined in claim 2 in which the presence of the second signal indicating that the count of the counting means equals the selected count inhibits backlash compensating directed movement for a commanded movement in the one direciton.

4. The invention as defined in claim 2 in which the presence of the first signal indicating that the count of the counting means is zero inhibits backlash compensating directed movement for a commanded movement in the other direction.

* * * * *